United States Patent
Schotten

(10) Patent No.: US 8,018,833 B2
(45) Date of Patent: *Sep. 13, 2011

(54) METHOD AND SYSTEM FOR ADAPTING AN EFFECTIVE SPREADING SEQUENCE IN A COMMUNICATION SYSTEM USING DIRECT SEQUENCE SPREADING

(75) Inventor: Hans Dieter Schotten, Nuremberg (DE)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/721,840

(22) Filed: Mar. 11, 2010

(65) Prior Publication Data

US 2010/0166040 A1 Jul. 1, 2010

Related U.S. Application Data

(63) Continuation of application No. 11/158,589, filed on Jun. 21, 2005, now Pat. No. 7,693,037.

(51) Int. Cl.
*H04J 11/00* (2006.01)
*H04B 7/216* (2006.01)
*H04B 1/00* (2006.01)

(52) U.S. Cl. ......... 370/208; 370/335; 370/342; 375/140

(58) Field of Classification Search .......... 370/208–211, 370/328–349, 431, 437–448; 375/140–149, 375/267, 299, 346–349, 367
See application file for complete search history.

(56) References Cited

U.S. PATENT DOCUMENTS

| | | | |
|---|---|---|---|
| 6,175,588 B1 | 1/2001 | Visotsky et al. | |
| 6,298,092 B1 | 10/2001 | Heath, Jr. et al. | |
| 6,304,593 B1 | 10/2001 | Alouini et al. | |
| 6,351,499 B1 | 2/2002 | Paulraj et al. | |
| 7,139,324 B1 | 11/2006 | Ylitalo et al. | |
| 7,142,585 B2 | 11/2006 | Baltersee et al. | |
| 7,158,770 B2 | 1/2007 | Hanaoka et al. | |
| 7,386,045 B2 * | 6/2008 | Bar-Ness et al. | 375/238 |
| 7,593,347 B2 * | 9/2009 | Maltsev et al. | 370/252 |
| 7,668,227 B2 * | 2/2010 | Grant et al. | 375/148 |

(Continued)

OTHER PUBLICATIONS

Fengfang Yang et al. "The Performance and Design Criterion of Phase Spreading Sequences for DS/SSMA Communications With Full Response CPM Over Rayleigh Fading Channels" Globecom '99. vol. 18, Dec. 5. 1999, pp. 914-918.

(Continued)

*Primary Examiner* — Tri H Phan
(74) *Attorney, Agent, or Firm* — Kenneth K. Vu; Nicholas A. Cole

(57) ABSTRACT

A method and system for adapting an effective spreading sequence in a wire-line or a wireless communication system using direct sequence spreading system is described. A station of the communication system determines a state of a communication channel, represented by, e.g., an impulse response, a step response, or any other characteristic known to one skilled in the art. The station determines the channel state by measurements of a received signal or by receiving a feedback signal comprising an information enabling the station to determine the plurality of linearly related phases The station then determines a plurality of linearly related phases in accordance with the state of the communication channel, and then applies at least one of the plurality of linearly related phases to at least one sample of the effective spreading sequence.

60 Claims, 4 Drawing Sheets

U.S. PATENT DOCUMENTS

| | | | |
|---|---|---|---|
| 7,693,037 B2 * | 4/2010 | Schotten | 370/208 |
| 7,751,372 B2 * | 7/2010 | Monsen | 370/335 |
| 2002/0176482 A1 * | 11/2002 | Chien | 375/132 |
| 2003/0137957 A1 | 7/2003 | Kakura et al. | |
| 2004/0240565 A1 | 12/2004 | Santhoff et al. | |
| 2005/0281226 A1 * | 12/2005 | Lee et al. | 370/329 |
| 2006/0182015 A1 * | 8/2006 | Kim | 370/203 |
| 2006/0256761 A1 * | 11/2006 | Meylan et al. | 370/338 |
| 2008/0130674 A1 | 6/2008 | Ahmed-Ouameur et al. | |
| 2009/0086647 A1 * | 4/2009 | Shnaider et al. | 370/252 |
| 2009/0129322 A1 * | 5/2009 | Suwa et al. | 370/329 |

OTHER PUBLICATIONS

International Search Report, PCT/US06/024330, International Search Authority, European Patent Office, Feb. 13, 2007.

"Robust equalization for spread-response precoding systems," Proceedings of the IEEE International Conference on Acoustics, Speech and Signal Processing, May 1998.

Written Opinion, PCT/US06/024330, International Search Authority, European Patent Office, Feb. 13, 2007.

* cited by examiner

METHOD AND SYSTEM FOR ADAPTING AN EFFECTIVE SPREADING SEQUENCE IN A COMMUNICATION SYSTEM USING DIRECT SEQUENCE SPREADING

CLAIM OF PRIORITY UNDER 35 U.S.C. §120

The present Application for Patent is a continuation of patent application Ser. No. 11/158,589 filed Jun. 21, 2005, entitled, "Method And System For Adapting An Effective Spreading Sequence In A Communication System Using Direct Sequence Spreading," currently pending and assigned to the assignee hereof and hereby expressly incorporated by reference herein.

FIELD

The present invention relates to a wire-line or a wireless communication system using direct sequence spreading. More particularly, the present invention relates to a method and system for adapting an effective spreading sequence in such a system.

BACKGROUND

Communication systems have been developed to allow transmission of information signals from an origination station to a physically distinct destination station. In transmitting an information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier wave is confined within the communication channel bandwidth. At the destination station, the original information signal is reconstructed from the modulated carrier wave received over the communication channel. In general, such a reconstruction is achieved by using an inverse of the modulation process employed by the origination station.

Modulation also facilitates multiple-access, i.e., simultaneous transmission and/or reception, of several signals over a common communication channel. Several multiple-access techniques are known in the art, such as time division multiple-access (TDMA), frequency division multiple-access (FDMA), code-division multiple-access (CDMA) spread spectrum system.

Originally, the multiple-access communication systems were designed to carry analog signals (typically voice signals) between users. With the development of digital communication systems, there came the ability to transfer digital data representing any kind of information, and not only voice information.

The above-discussed techniques apply equally to wireless and wire-based communication systems. Wire-line communication systems transfer information along a path constrained by a guide, e.g., a copper cable, a fiber optic cable, said guide connecting the users; while wireless communication systems transfer information along path between users not constrained by any guide.

By way of example, in a multiple-access wireless communication system, communications between users on subscriber stations are conducted through an access network. A subscriber station is an entity with which an access network communicates through a wireless path. A subscriber station may be mobile or stationary. An access network is a collection of at least one base station and one or more base stations' controllers. An access network transports information signals between users on subscriber stations. The access network may be further connected to additional networks outside the access network, such as a corporate intranet or the Internet, and may transport information signals between each base station and such outside networks. A base station is an access network entity, with which subscriber stations communicate.

A first user on one wireless subscriber station communicates to a second user on a second wireless subscriber station by conveying an information signal on a reverse link to a base station. The base station receives the information signal and conveys the information signal on a forward link to the second subscriber station. If the second subscriber station is not in the area served by the base station, the base station routes the data to another base station, in whose service area the second subscriber station is located. The second base station then conveys the information signal on a forward link to the second subscriber station. The forward link refers to transmissions from a base station to a wireless subscriber station, and the reverse link refers to transmissions from a wireless subscriber station to a base station. Likewise, the communication can be conducted between a first user on a wireless subscriber station and a second user on a landline station. A base station receives the data from the first user on the wireless subscriber station on a reverse link, and routes the data through a public switched telephone network (PSTN) to the second user on a landline station.

It is well known that quality and effectiveness of information transfer in a wireless communication system is dependent on the state of a communication channel between a source terminal and a destination terminal. Such a state can be represented as, for example, the channel impulse response, an unit step response, a path loss and the path loss' variation at a subscriber station within a coverage area of a base station, interference from other subscriber stations both from the same cell and from other cell, interference from other base stations, and other factors known to one of ordinary skill in the art. A designer of a communication system can significantly increase the efficiency of transmissions over a communication channel if the channel state information can be used at the transmitter to adapt the transmitted signal to the channel.

It is noted that the above discussed efficiency of signal transfer applies also for systems that do not "communicate" information per se, e.g., RADAR systems, because the effective transmission of the signal non bearing information is still one of a primary issues. To prevent obscuring the disclosure with excessive terminology repetition, the term communication system is used collectively for all types of systems.

One of the proposed approaches to utilize the channel state information is to use filter matched to the channel. This approach results in a high peak-to-average ratio of power required for transmission, and (for certain modulation schemes) also in need for very linear transmitter. These requirements translate into very expensive transmitters. Furthermore, the amount of the channel state information necessary for proper determination of the matched filter is high, resulting in a high feedback rate if the station utilizing the channel state information is not the station determining the channel state information.

Another proposed approach, better suited to modulation schemes using a direct sequence spreading, is to adapt a spreading sequence to a channel by selecting, from a set of spreading sequences, the spreading sequence that results in the best transmission efficiency in accordance with the channel state information. An advantage of this approach is a lower feedback rate if the station utilizing the channel state information is not the station determining the channel state information. However, the need to change the spreading sequence causes several problems. As is explained in detail below, one selection criterion selects the spreading sequence, an autocorrelation function of which multiplied by an autocorrelation function of the channel impulse response yields a maximum. Clearly, to obtain such a sequence, the above-described computation must be performed for each spreading sequence from the set of spreading sequences. The selection criterion is; therefore, computationally intensive.

Furthermore, such an optimal selection of a spreading sequence in a multi-user environment may result in selection of identical sequences for at least two users, causing increased interference. As a consequence, should interference be avoided, optimal spreading sequence assignment using this approach is not possible.

Because an insignificant number of currently used communication systems based on the CDMA standard known as IS-95 ("TIA/EIA/IS-95 Mobile Station-Base Station Compatibility Standard for Dual-Mode Wide-Band Spread Spectrum Cellular System") and CDMA2000 ("TR-45.5 Physical Layer Standard for CDMA2000 Spread Spectrum Systems"), as well as communication systems according to a standard known as W-CDMA, which is a CDMA-based standard ("3rd Generation Partnership Project" or "3GPP," see for example document nos. 3G TS 25.211, 3G TS 25.212, 3G TS 25.213, and 3G TS 25.214), utilize direct sequence spreading, there is a need in the art for an apparatus and method for adapting a spreading sequence to a channel in a communication system.

SUMMARY

In one aspect of the invention, a method for adapting an effective spreading sequence in a communication system is disclosed. The method comprises determining a state of a communication channel and determining a plurality of linearly related phases in accordance with the state of the communication channel. The method further comprises applying at least one of the plurality of linearly related phases to at least one sample of the effective spreading sequence.

In another aspect of the invention, an apparatus for adapting an effective spreading sequence in a communication system is disclosed. The apparatus comprises means for determining a state of a communication channel and means for determining a plurality of linearly related phases in accordance with the state of the communication channel. The apparatus further comprises means for applying at least one of the plurality of linearly related phases to at least one sample of the effective spreading sequence.

In another aspect of the invention, a method for adapting an effective spreading sequence in a communication system is disclosed. The method comprises receiving a feedback signal comprising information enabling determination of a plurality of linearly related phases and determining the plurality of linearly related phases in accordance with the feedback. The method further comprises applying at least one of the plurality of linearly related phases to at least one sample of the effective spreading sequence.

In another aspect of the invention, an apparatus for adapting an effective spreading sequence in a communication system is disclosed. The apparatus comprises means for receiving a feedback signal comprising information enabling determination of a plurality of linearly related phases and means for determining the plurality of linearly related phases in accordance with the feedback. The apparatus further comprises means for applying at least one of the plurality of linearly related phases to at least one sample of the effective spreading sequence.

BRIEF DESCRIPTION OF THE DRAWINGS

The features of the invention are set forth with particularity in the appended claims and together with advantages thereof will become clearer from consideration of the following detailed description of an exemplary embodiment of the invention given with reference to the accompanying drawings.

DETAILED DESCRIPTION

Figure 1:
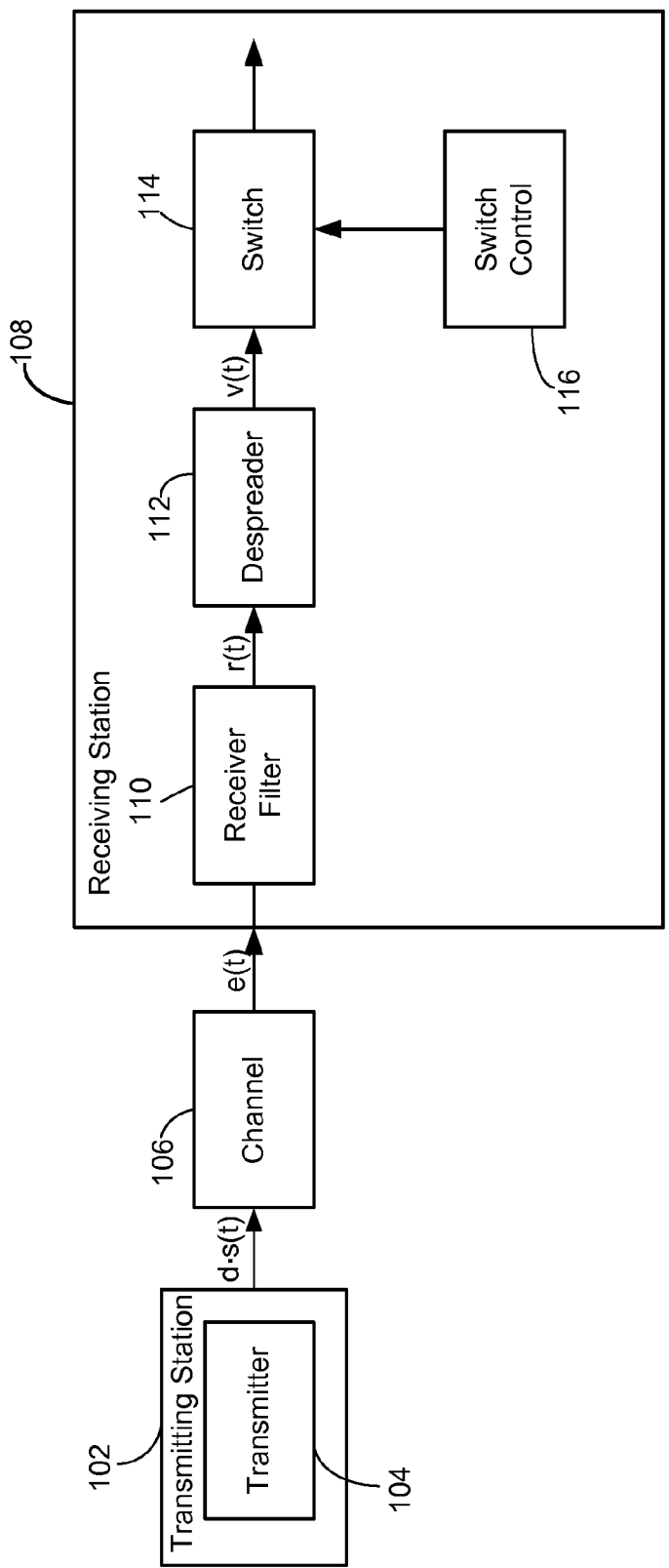
FIG. 1 illustrates a conceptual diagram of a communication system.

FIG. 1 illustrates a conceptual diagram of a communication system comprising transmitting station 102 and a receiving station 108. The transmitting station 102 comprises a block 104 representing a transmitter, which transmits information signal d spread with an effective spreading sequence s(t), denoted d·s(t). Signal d may comprise a digital signal. In general, a digital signal is processed before being spread. Such a processing may comprise digitization of originally analog signal, interleaving, encoding, and other processing known in the art; however, such processing is not shown for clarity reasons. The variable t denotes continuous time.

An effective spreading sequence s(t) used to spread the signal d may comprise a sequence used to distinguish different channels, e.g., Walsh code, a Hadamard code, an orthogonal variable spreading factor (OVSF) code, and the like, or it may comprise a product of a sequence used to distinguish different channels with one or more scrambling sequences, as described in greater details below. The terms spreading sequence and spreading code are used interchangeably in the art.

By way of example, in a communication system according to the IS-95 and IS-2000 standards a scrambling sequence may comprise a long code; in a communication system according to the WCDMA standard a scrambling sequence may comprise a long scrambling sequence.

As the spread signal d·s(t) propagates through a block 106 representing a channel, the spread signal d·s(t) is modified by the channel in accordance with the channel state; thus the receiving station 108 receives this modified signal e(t). As discussed above, a state of the channel may be represented by, e.g., an impulse response, an unit step response, or any other representations known to one skilled in the art. The term channel state will be used collectively for channel state and channel state representation, unless a use of the collective term would cause a confusion. For tutorial reasons an impulse response h(t) will be used. Then, the modified signal e(t) can be described by Equation (1):

$$e(t) = d \cdot s(t) * h(t) \qquad (1)$$

where the symbol * indicates convolution.

It is customary to evaluate performance of a receiving station in accordance with the despread signal. A conceptual diagram of a receiving station 108 comprises block 110 representing a receiver-filter, block 112 representing a despreader, block 114 representing a switch, and block 116 representing a switch control. The conceptual diagram of the receiving station 108 corresponds to a Rake receiver.

The block 110 may be characterized by, e.g., impulse response, unit step response, or any other characteristic known to one skilled in the art. For tutorial reasons a complex conjugate h*(T$_f$-t) of the channel impulse response h(t) will be used. The variable T$_f$ denotes duration of the channel impulse response and assures in mathematical description causality of a system. Because the communication system must be causal, to simplify mathematical notation, the complex conjugate of the impulse response is hereafter denoted as h*(-t). The block 110 outputs signal r(t) that can be described by Equation (2):

$$r(t)=d \cdot s(t)*h*(-t) \quad (2)$$

The block 112 may comprise a matched filter and may be characterized by, e.g., impulse response, unit step response, or any other characteristic known to one skilled in the art, matched to the received effective spreading sequence. For descriptive reasons a complex conjugate s*(T$_d$-t) of the spreading sequence impulse response s(t) will be used. The variable T$_d$ denotes an integration period of the block 112. For the same reasons stated regarding T$_f$, the variable T$_d$ will be omitted to simplify mathematical notation, and the complex conjugate of the impulse response is hereafter denoted as s*(-t). A signal v(t) at the output of the block 112 can be described by Equation (3):

$$v(t)=d \cdot s(t)*h(t)*h*(-t)*s*(-t)=d \cdot C_{ss}(t)*C_{hh}(t) \quad (3)$$

where:

$C_{ss}(t)$ is a value of an aperiodic autocorrelation of the effective spreading sequence; and $C_{hh}(t)$ is a value of an aperiodic autocorrelation of the impulse response of the communication channel.

As is well known in the art, the discrete-time aperiodic autocorrelation of the effective spreading sequence can be expressed as Equation (4):

$$C_{ss}(m) = \sum_{n=0}^{SF-1-m} s^*(n) \cdot s(n+m) \text{ for } m \geq 0 \quad (4)$$

Similarly, discrete-time aperiodic autocorrelation of the channel impulse response can be expressed as Equation (5):

$$C_{hh}(m) = \sum_{n=0}^{L-1-m} h^*(n) \cdot h(n+m) \text{ for } m \geq 0 \quad (5)$$

where:

SF is the spreading factor; and

L is the length in T$_d$ of the channel impulse response. Note that $C_{hh}(-m)=C_{hh}*(m)$ and $C_{ss}(-m)=C_{ss}*(m)$. Spreading factor is a number of chips of a spreading sequence per unit of a spread digital signal. The term "chip" is a unit of a spreading sequence signal having at least two possible values.

The signal v(t) is sampled by the block 114 at intervals corresponding to the integration period T$_d$. The intervals corresponding to the integration period T$_d$ are controlled by block 116, which provides proper sampling signal to the block 114. The signal at the output of the block 114 represents the signal v(t) evaluated at discrete intervals l·T$_d$, where l Is an integer number. Because the time dependency is of no concern in the following description, the continuous time variable t may be replaced with a sample index variable m. Equation (3) can then be re-written as Equation (6):

$$v = d \sum_m C_{ss}(m) \cdot C_{hh}^*(m) \quad (6)$$

where $C_{hh}(m)$ and $C_{ss}(m)$ now denote the discrete-time aperiodic autocorrelation function defined below. The summation is done over all m for which the argument of the summation does not vanish.

As discussed, performance of a transmission scheme is evaluated by a magnitude of a despread signal at a receiving station; the higher the magnitude, the better the performance at the receiving station. From Equation (6) we obtain the magnitude:

$$v' = \text{Re}\left(\sum_m C_{ss}(m) \cdot C_{hh}^*(m)\right) \quad (7)$$

where Re( ) denotes real part of the term in parenthesis; and m is a summation index, for which the argument of the summation does not vanish.

Given the definition of $C_{hh}(m)$ and $C_{ss}(m)$ above, and considering that the term for sample index m=0 in Equation (6) does not depend on the spreading code since $C_{ss}(0)$ is independent of the spreading code and, therefore, the corresponding term does not need to be considered, m attains values $1 \leq m \leq k$ where k=min(SF−1; L−1)

Considering the possibility of maximizing Equation (7), the term $C_{hh}(m)$ in Equation (7) corresponding to the autocorrelation $C_{hh}(t)$ is determined by the channel state. However, the transmitting station 102 has control over the autocorrelation $C_{ss}(t)$ corresponding to the term $C_{ss}(m)$ in the Equation (7). The term $C_{ss}(m)$ can be changed by adapting the sequence s(t). Thus, Equation (7) may be maximized by adapting the sequence s(t) so that the product of the aperiodic autocorrelations is maximal.

The sequence s(t) may be adapted by linear phase adaptation, i.e., by applying at least one of the plurality of linearly related phases to at least one sample of the effective spreading sequence. Although the sequence s(t) is continuous in time, only the value of the sequence at s(m) is important. One way of adaptation is multiplication, in which case the adapted sequence s'(m) can be expressed by Equation (8):

$$s'(m)=e^{j\theta(m)} \cdot s(m) \quad (8)$$

where: j=sqrt(−1);

m is the sample index; and

θ(m) is the m-th of the plurality of phases.

Because the sequence s(m) comprises, in general, a complex number, which can be expressed as a phasor, the multiplication is equivalent to applying a phase shift to each of the samples.

For the purposes of further analysis, the phase may be defined by Equation (9):

$$\theta(m) = \frac{2\pi \alpha m}{M} \quad (9)$$

where: α is a phase factor; and

M is the number of phases.

In general, there is no limitation on the selection of M and a corresponding set of phase factors α. Consequently, phases θ(m) may attain any of M values from 0 to 2·π radians. The need for such arbitrary phases may not be a problem in newly designed communication systems; however, certain existing communication system may take advantage of limiting the set of values the phases θ(m) may attain. For example, by limiting the number of values for the phase factor α to M=4, and selecting a value of the phase factor α from the set {0, 1, 2, 3} limits the number of phases to $$\{0, \frac{\pi}{4}, \pi, 3 \cdot \frac{\pi}{4}\}$$

radians. Such a selection corresponds to a quadrature-phase shift keying (QPSK) modulation. It is noted; however, that such a selection of the set of values for the phase factor α is not a limitation of the phase adaptation algorithm, but rather an implementation issue.

The autocorrelation function $C_{s's'}(m)$ for the adapted sequence s'(m) is expressed by Equation (9) for m≥0:

$$C_{s's'}(m) = \sum_{n=0}^{SF-1-m} e^{\frac{-j2\pi\alpha n}{M}} \cdot s^*(n) \cdot e^{\frac{-j2\pi(\alpha(n+m))}{M}} s(n+m) \qquad (10)$$
$$= e^{\frac{j2\pi\alpha m}{M}} C_{SS}(m).$$

Substituting Equation (10) to Equation (7) yields Equation (11) for the term to be maximized:

$$v' = \text{Re}\left(\sum_{m=1}^{k} C_{s's'}(m) C_{hh}^*(m)\right) \qquad (11)$$
$$= \text{Re}\left(\sum_{m=1}^{k} e^{\frac{j2\pi\alpha m}{M}} C_{ss}(m) C_{hh}^*(m)\right)$$

As noted in analysis of Equation (7), equally applicable to Equation (11), to maximize the equation by adapting the effective spreading sequence in a communication system, the term $C_{ss}(m)$ must be calculated. As described above, $C_{ss}(m)$ is calculated for all sample indexes m in accordance with Equation (4) from an impulse response of the effective spreading sequence.

Additionally, a communication channel state must be determined. Then the term $C_{hh}(m)$ is derived from the channel state. As discussed above, for tutorial purposes an impulse response was used as a representation of the channel state. However, any other representation with a defined relationship to impulse response, e.g., step response, allowing derivation of the term $C_{hh}(m)$ can be used.

The channel state may be determined, e.g., from a measurement of a channel by a channel estimation unit. Such an approach takes advantage of the fact that a channel estimation unit is present in many modern receiver stations (see, e.g., FIG. 3, block 330, described below), and yields a very accurate impulse response estimate, which improves efficiency of the adaptation in an operating environment of the communication system, in which the channel state change rapidly. Once an impulse response is obtained, $C_{hh}(m)$ is calculated for each of the plurality of indexes m in accordance with Equation (5).

Once the values of the aperiodic autocorrelations $C_{ss}(m)$ and $C_{hh}(m)$ are determined, the different phases maximizing Equation (11) can be determined. Because the different phases are linearly related through the phase factor α, maximizing Equation (11) can be viewed as determining the value of the phase factor α that yields a maximum of Equation (11). Accordingly, the calculated aperiodic autocorrelations $C_{ss}(m)$ and $C_{hh}(m)$ are substituted into Equation (11), and Equation (11) is solved for the value of the phase factor α that yields a maximum of Equation (11).

Once the linearly related phases are determined, at least one of the linearly related phases is applied to at least one sample of the effective spreading sequence.

Alternatively, the value of the first sample, i.e., the sample with index m=0, is excluded from the calculated aperiodic autocorrelation of the impulse response of the communication channel $C_{hh}(m)$. Then, the maximum magnitude value from the remaining samples of the aperiodic autocorrelation $C_{hh}(m)$ is determined. This value, with sample index $m_{max}$, is denoted $C_{hh}(m_{max})$. The value of the aperiodic autocorrelation $C_{ss}(m_{max})$ is then determined, and the plurality of linearly related phases is determined in accordance with the $C_{hh}(m_{max})$ and the $C_{ss}(m_{max})$. Accordingly, equation (11) can then be approximated by Equation (12):

$$v' = \text{Re}\left(e^{\frac{j2\pi\alpha m_{max}}{M}} C_{ss}(m_{max}) \cdot C_{hh}^*(m_{max})\right) \qquad (12)$$

Equation (12) is solved for the value of the phase factor α that yields a maximum of Equation (12).

It can be shown that a solution of Equation (12) for the value of the phase factor α that yields a maximum of Equation (12) only requires the values of the phases of $C_{ss}(m_{max})$ and $C_{hh}^*(m_{max})$. Mathematically, finding a maximum of Equation (12) is equivalent to finding minimum of the expression $$\left(\frac{2\pi\alpha m_{max}}{M} + \text{arc}(C_{ss}(m_{max})) + \text{arc}(C_{hh}^*(m_{max}))\right),$$

where arc( ) identifies the phase of the argument in the parenthesis.

Alternatively, the indexes $m_1, m_2 > m_1$, corresponding to the two largest magnitudes of the of the impulse response h(m) are determined. Considering Equation (5), the only non-zero value of the aperiodic autocorrelation $C_{hh}(m)$ for m≠0 occurs for $m_{max} = m_2 - m_1$, and can be calculated from the values $h(m_1)$ and $h(m_2)$. The value of the aperiodic autocorrelation $C_{ss}(m_{max})$ is then determined, and the plurality of linearly related phases is determined in accordance with the $C_{hh}(m_{max})$ and the $C_{ss}(m_{max})$. Accordingly, Equation (12) is solved for the value of the phase factor α that yields a maximum of Equation (12).

It can be shown that a solution of Equation (12) for the value of the phase factor α that yields a maximum of Equation (12) only requires the values of the phases of $C_{ss}(m_{max})$ and $C_{hh}^*(m_{max})$. Mathematically, finding a maximum of Equation (11) is equivalent to finding minimum of the expression $$\left(\frac{2\pi\alpha m_{max}}{M} + \text{arc}(C_{ss}(m_{max})) + \text{arc}(C_{hh}^*(m_{max}))\right).$$

Because the phase of $C_{hh}*(m_{max})$ is equal to the phase difference of $h(m_1)$ and $h(m_2)$ without a sign, it is not necessary to evaluate $C_{hh}*(m_{max})$.

Once the phase factor α, or equivalently the values of corresponding phases θ(m) are determined as described above, the adapted sequence s' (m) can be calculated form Equation (8).

In a class of communication systems, the communication channel state is different for a transmission channel and a reception channel from the perspective of a communication station. By way of example, in a Frequency Division Duplex (FDD) communication system, the communication stations are allocated separate frequencies for transmission and reception. The separate frequencies may be so far apart in the frequency spectrum that the state of the communication channel modulated at the transmission frequency is different from the state of the communication channel modulated at the reception frequency, the difference being greater than an acceptable error margin.

To allow such communication systems to take advantage of effective spreading sequence adaptation, a measure assuring that the plurality of linearly related phases is common to a transmitting communication station and a receiving communication station must be implemented.

According to one such measure, a first communication station receiving a communication channel modulated at a first frequency determines a state of the communication channel. The first communication station then determines a plurality of linearly related phases in accordance with the state of the communication channel and reports (feeds back), over a communication channel modulated on a second frequency, information enabling a second communication station to determine the plurality of linearly related phases.

The second communication station receiving signal comprising the feedback information, determines the plurality of linearly related phases in accordance with the feedback information, and applies at least one of the plurality of linearly related phases to at least one sample of the effective spreading sequence. As follows from Equation (8) the first communication station and the second communication station must adapt the respective spreading sequence with a different sign of the plurality of linearly related phases.

The feedback information enabling the second communication station to determine the plurality of linearly related phases may comprise at least one of the plurality of phases θ.

Because the phases are linearly related, when the first communication station and the second communication station agree in advance on the number of phases M and the set of phase factors α, feedback information comprising only one of the plurality of phases θ(m) is sufficient. Additionally, if the effective spreading sequence is invariable, i.e., the spreading sequence does not change from a digital data unit to a digital data unit, the one of the plurality of phases θ(m) is the same for all digital data units.

Alternatively, if the effective spreading sequence is variable, i.e., the spreading sequence does change form a digital data unit to a digital data unit, the one of the plurality of phases θ(m) may be re-determined and fed back for each of the variable effective spreading sequence upon detecting a change in the state of the communication channel.

Alternatively, the feedback information enabling the second communication station to determine the plurality of linearly related phases may comprise the phase factor α. An advantage of this approach is that the second communication station need not carry out any computation. Additionally, if the effective spreading sequence is invariable, i.e., the spreading sequence does not change from a digital data unit to a digital data unit, phase factor α is the same for all digital data units. This yields a relatively low feedback update rate because phase factor α need to be re-determined only upon detecting a change in the state of the communication channel.

Alternatively, if the effective spreading sequence is variable, i.e., the spreading sequence does change form a digital data unit to a digital data unit, the phase factor α may be re-determined and fed back for each of the variable effective spreading sequence upon detecting a change in the state of the communication channel. This yields a relatively higher feedback.

To lower the feedback in this scenario, the phase factor α may be re-determined and fed back only for one of the variable effective spreading sequences upon detecting a change in the state of the communication channel. Accordingly, upon detecting a change in the state of the communication channel, the receiving station determines the channel state. The receiving station then calculates a phase factor $α_1$ for one of the variable effective spreading sequences characterized by an autocorrelation $C_{ss_1}(m)$ in accordance with the determined channel state represented by, e.g., an autocorrelation $C_{hh}(m)$. The determined channel state together with the phase factor $α_1$ and, optionally the value of $C_{ss_1}(m)$, are then communicated to the transmitting station.

Both the receiving station and the transmitting station use the determined channel state, the phase factor $α_1$ and, optionally the value of $C_{ss_1}(m)$, and as input parameters to a statistical model of the autocorrelation function of the communication channel to calculate the phase factors $α_k$, where k denotes the remaining effective spreading sequences.

It is noted that a design of the statistical model is a design choice, dependent e.g., on the sophistication of the designer, available computing power, complexity of the determined channel state, and the like. However, in a way of example, several models are presented.

For a determined channel state represented by, e.g., only two non-zero samples, a reference index $m_{ref}$ is set to equal a value of 1 when the two non-zero samples are consequent, and to equal a value of $m_{max}$ (as defined above) otherwise. For a determined channel state represented by more than two non-zero samples, a reference index $m_{ref}$ is expressed by Equation (13):

$$m_{ref} = \max(|C_{ss_1}(m)|\sqrt{SF-m}) \text{ for } \forall m \qquad (13)$$

The phase factors $α_k$ are then determined as phase factors minimizing the difference between the phase values determined for $α_1$ and $C_{ss_1}(m)$, i.e., $$\left(e^{\frac{j2α_1 \pi m_{ref}}{M}} \cdot C_{ss_1}(m_{ref})\right)$$

and for $α_k$ and $C_{ss_k}(m)$, i.e., $$\left(e^{\frac{j2α_k \pi m_{ref}}{M}} \cdot C_{ss_k}(m_{ref})\right).$$

Alternatively, the feedback information may comprise the communication channel state, e.g., the impulse response, itself. It is noted that it is not necessary to communicate the complete representation of the communication channel state. As described above, it may be sufficient to communicate information about the indices of the two largest magnitudes of the impulse response. The phase factor α is then determined as described above. The phase factor α is updated according to the above-described considerations.

To further decrease the feedback associated with communicating the communication channel state, an alternative way of determining the channel state may be used. It has been observed that certain operating environment(s) of the communication system yield typical, fairly invariable channel state. Such a channel state can be pre-determined in a form of a model for different operating environments in accordance with simulations, laboratory experiments, field trials and other engineering methods known in the art.

Figure 2:
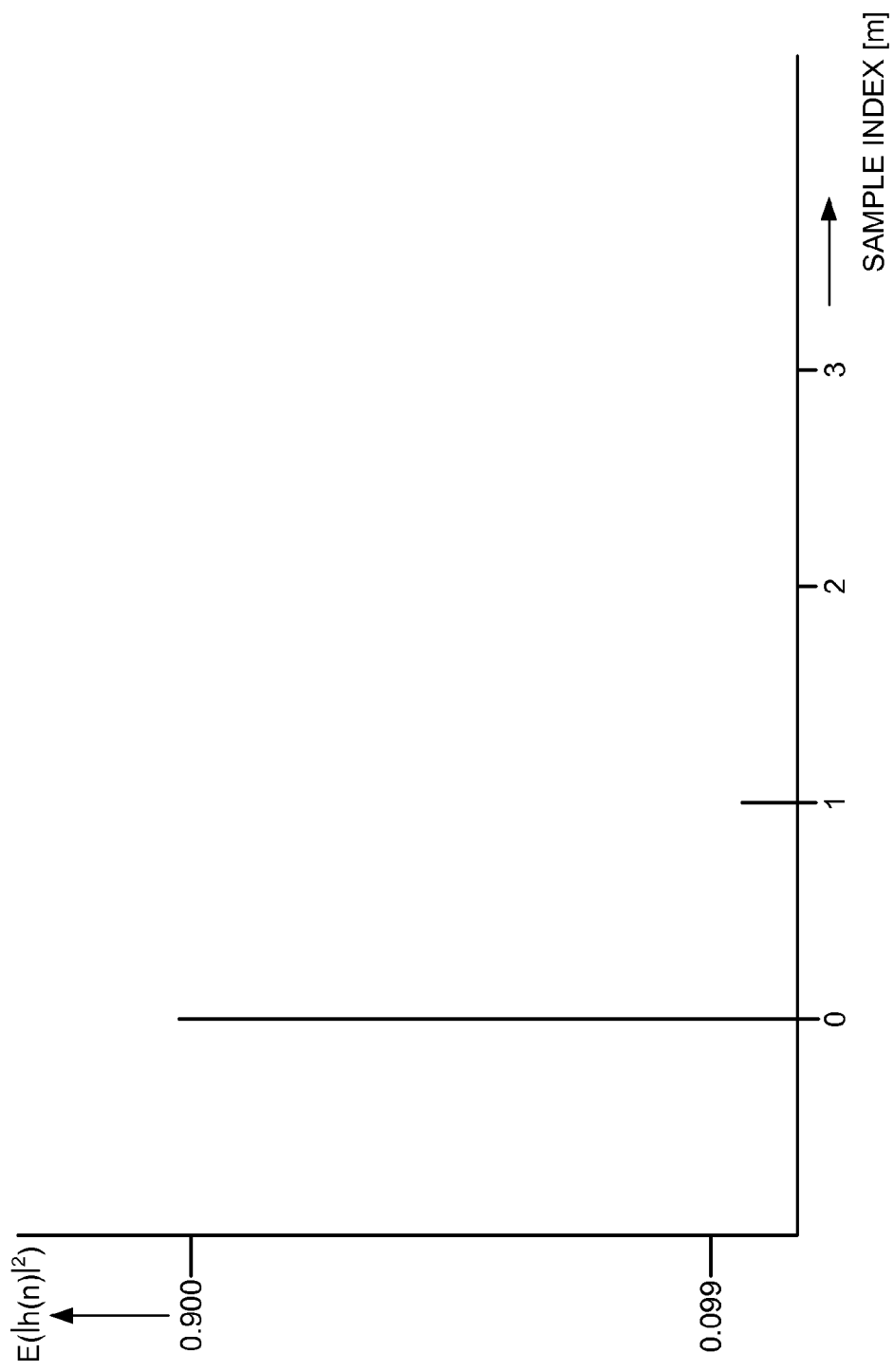
FIG. 2 illustrates a model of channel state of an exemplary operating environment in a form of a multi-path delay profile.

By way of example, FIG. 2 illustrates one such model of a channel state in a form of a multi-path delay profile. The multi-path delay profile is a statistical model comprising expected powers determined from an impulse response of an exemplary, e.g., indoor, operating environment. As can be observed FIG. 4, where the normalization $$\sum_m |h(m)|^2 = 1$$

is used the 0-th sample of the impulse response has an expected power of approximately $E(|h(0)|^2 = 0.9$, the 1st sample of the impulse response has an expected power of approximately $E(|h(1)|^2 = 0.099$, and the rest of the expected power is distributed among the remaining samples. Because the expected power contribution from the remaining samples is below a power threshold, these samples may be omitted. Consequently, the model of the channel state has only few non-zero samples. It is noted that the power threshold is a design criterion.

The use of such a model, agreed upon by both the transmitting station and the receiving station, decreases the amount of feedback required because the channel state to be used can be determined from the model and several parameters specifying the model based on the channel state. By way of an example, the model from FIG. 2 would be specified by measurement of phases of the non-zero samples, and only a phase difference between these samples needs to be determined and communicated.

By way of example, a first station of the communication system determines an operating environment and selects a pre-determined channel state model in accordance with the determined operating environment. The first station then communicates the selected model, or an identifier of the selected model, to the other station(s) in the communication system. Afterwards, the first station measures the channel state and communicates to the other station(s) only the minimum parameters of the channel state required for reconstruction of the channel state from the model and the communicated parameters at the other station(s).

Alternatively, the feedback information may comprise the aperiodic autocorrelation of the impulse response of the communication channel $C_{hh}(m)$. Again, it is not necessary to communicate the complete aperiodic autocorrelation of the impulse response. As described above, it may be sufficient to convey information about the first maxima of the impulse response. The phase factor α is then determined from the received aperiodic autocorrelation of the impulse response. The phase factor α is updated according to the above-described considerations.

Figure 3:
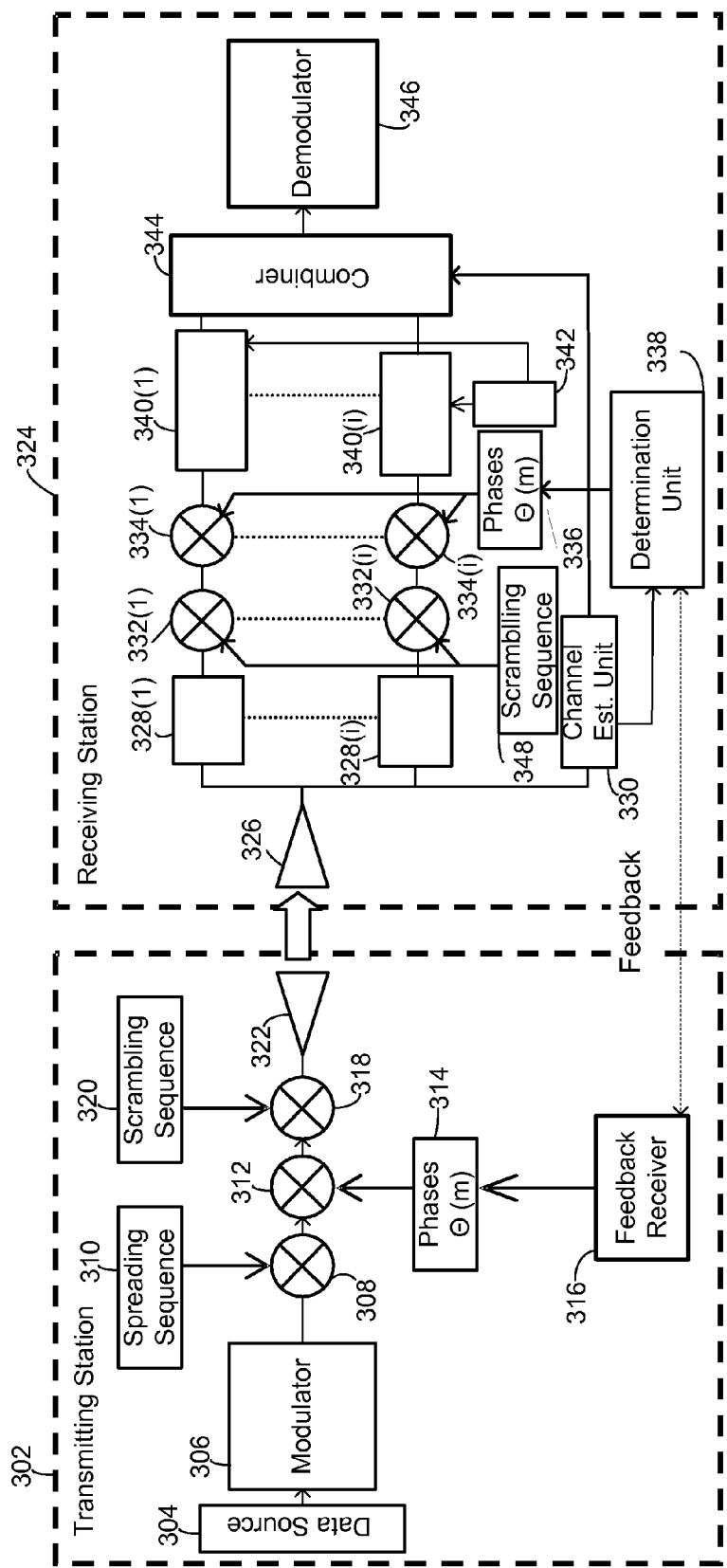
FIG. 3 illustrates a conceptual diagram of a communication system for adapting an effective spreading sequence.

FIG. 3 illustrates a conceptual block of a communication system for adapting an effective spreading sequence, which may be utilized in a FDD communication system. Although a cellular wireless communication system terminology is used, such is just for tutorial purpose; any direct sequence (DS) CDMA communication system that allows providing feedback information from a receiving station to the transmitting station can be used.

To prevent obscuring the description of FIG. 3 with undue details, the first communication station is referred to as a receiving station 324 and shows only the structure facilitating the reception function. Likewise, the second communication station is referred to as a transmitting station 302, and only the structure facilitating the transmission function is shown. However, since the communication is bi-directional, the transmitting station 302 also comprises the structure facilitating the reception function, and the receiving station 324 also comprises the structure facilitating the reception function.

The transmitting station 302 comprises a block 304 representing a source of data and any processing of the data that may be carried out before modulation. As discussed above, such a processing may comprise digitization of originally analog signal, interleaving, encoding, and other processing known in the art. The processed data is provided to a block 306, which modulates the processed data. The modulation is carried out in accordance with the communication system's modulation format. The modulated data are provided to a block 308, which spreads the modulated data with a spreading sequence provided from block 310. The spread data is provided to block 312, which adapts the spread data by phases θ(m) provided from block 314. The phases θ(m) are determined in accordance with the information provided from a block 316, representing a feedback receiver. It is noted that the division of function between blocks 316 and 314 is rather artificial for purposes of explanation. The function of the block 314 may be in optionally performed by block 316. The adapted spread data is provided to a block 318, which scrambles the adapted spread data with a scrambling sequence provided from block 320. The scrambled data is provided to a block 322, which transmits the scrambled data.

It is well known in the art that the sequence in which the blocks 308, 312, and 318 (as well as associated blocks 310, 314, and 320), operate on the modulated data is changeable. As such blocks 308 and 318 can be viewed as generating an effective spreading sequence, and block 312 as adapting the effective spreading sequence.

Figure 4:
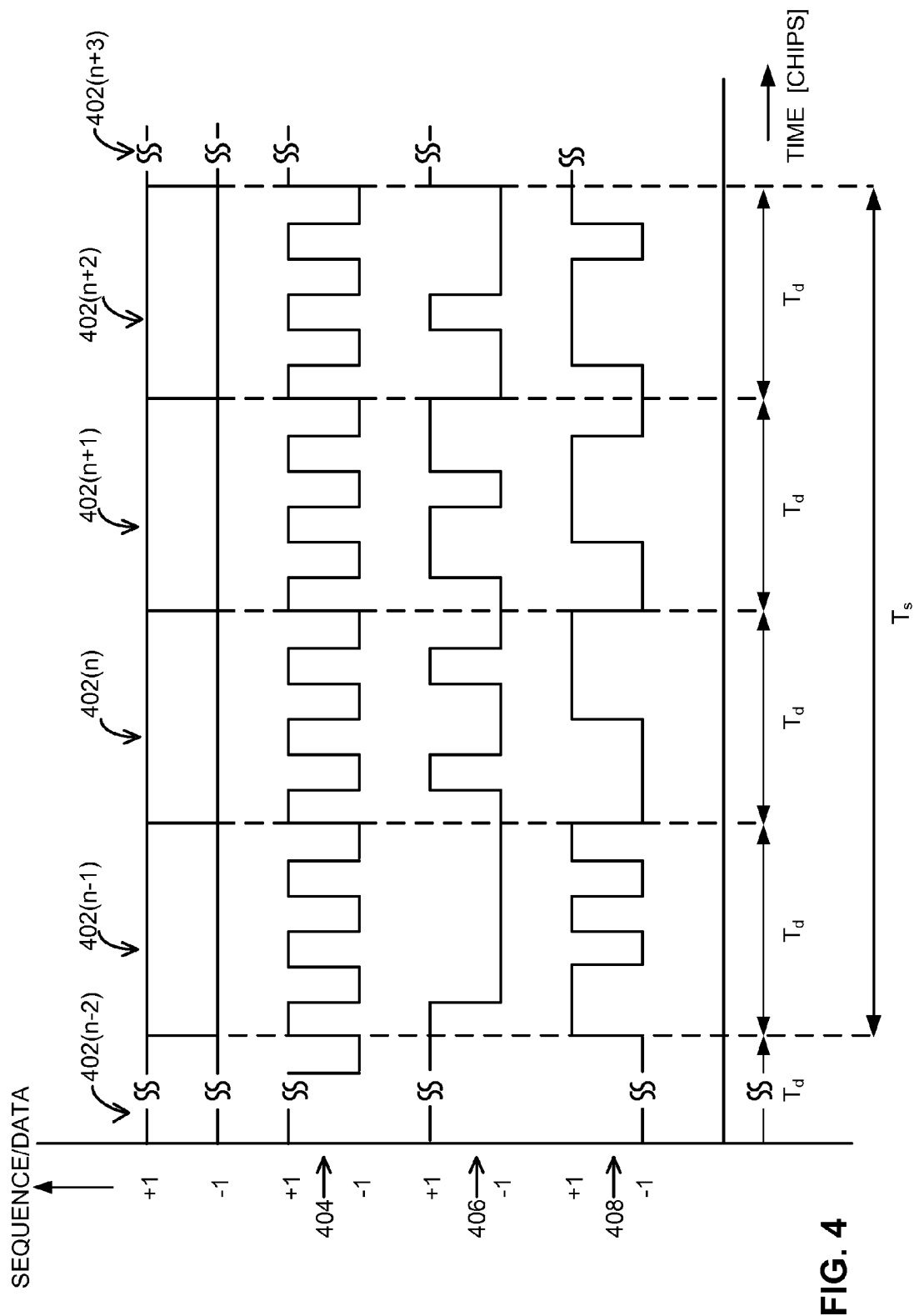
FIG. 4 illustrates a concept of effective spreading sequence.

FIG. 4 illustrates a concept of an effective spreading sequence. The data to be spread, e.g., the modulated data described in reference to FIG. 3, are organized in units identified as 402(n−2) to 402(n+3) of length $T_d$, expressed in chips. Such a unit may comprise, e.g., a data symbol. As discussed above, the units 402(n−2) to 402(n+3) may comprise digital data, therefore, the term digital data unit may also be used. The spreading sequence 404 comprising, e.g., Walsh code, a Hadamard code, an orthogonal variable spreading factor (OVSF) code, or the like, is the same for each of the units 402(n−2) to 402(n+3). The scrambling sequence 406 comprising, e.g. a long code used in a communication system according to IS-95, IS-2000 standards, has a period of length $T_S$, expressed in chips. The spreading sequence 404 and the scrambling sequence 406 combine into an effective spreading sequence 408, which is then used to spread the units 402(n−2) to 402(n+3). It can be observed that the effective spreading sequence 408 repeats itself every period $T_S$, and may be different for each of the units of length $T_d$ within the period $T_S$. It is, of course, possible to add as many scrambling sequences as possible.

It is noted that an effective spreading sequence with properties described above, e.g., repeating itself every period $T_S$ and generally different for each of the units of length $T_d$ within the period $T_S$, may be obtained by different structures.

Thus for example, referring back to FIG. 3, the blocks 320 and 318 could be deleted, and the block 310 could be configured to generate a pattern comprising a different spreading sequence in every unit of length $T_d$ within the period $T_S$, the pattern being repeated every period $T_S$.

Alternatively, the block 310 could be configured to generate the same spreading sequence in every unit of length $T_d$ regardless of the period $T_S$.

Alternatively, the block 310 could be configured to generate a different spreading sequence in every unit of length $T_d$ regardless of the period $T_S$.

The receiving station 324 comprises a Rake receiver, represented by the blocks 328(i), 330, 332(i), 340(i), 344, and 348 with supporting structure and function represented by blocks 334(i), 336, and 338. Because structure and function of Rake receiver are well known in the art, the Rake receiver is described only in a manner allowing understanding of the structure and function of the blocks 334(i), 336, and 338.

The signal received over a channel by a block 326, representing an antenna and a front end of the Rake receiver, is divided and provided to blocks 330 and 328(i).

Block 330 represents a channel estimation unit, which determines the channel state by measurements of the received signal. The determined channel state is provided to blocks 338 and 344.

Block 338 represents a determination unit, which determines information enabling determination of the plurality of linearly related phases in accordance with the channel state as described above. The information is then provided to block 336, described below. Furthermore, the block 338 provides feedback information to a block 316 in the transmitting station 302. The provided feedback information allows the transmitting station 302 to determine the plurality of linearly related phases as described above. It is noted that the division of function between blocks 336 and 338 is rather artificial for purposes of explanation. The function of the block 336 may be optionally performed by block 338.

Each of the blocks 328(i), 332(i), 334(i), and 340(i) identified by the same index i represents a part of an individual Rake receiver finger. In general a rake receiver comprises more than one finger, i.e., i>1; however, the number of fingers is not limitation on the use of the phase adaptation. A finger is a structure allowing a Rake receiver process one of the multiple paths over which a signal with identical information propagated from a transmitting station to a receiving station. Each block 328(i) delays the data from the individual multipath, which are then de-scrambled in a block 332(i) using a scrambling sequence generated by block 348.

If more than one scrambling sequence (see FIG. 4 and associated text) was used at the transmitting station 302, the structure, comprising block 232(i) and a scrambling sequence generated by block 334(i) is provided at the receiver for each of the scrambling sequence.

Similarly, should the block 320 be deleted and the block 310 be configured to generate a pattern comprising a different spreading sequence in every unit of length $T_d$ within the period $T_S$, the pattern being repeated every period $T_S$ at the transmitting station 302, the structure at the receiving station 324, comprising blocks 332(i) and a scrambling sequence generated by block 234(i) can be deleted, and the block 342 could be configured to generate a pattern comprising a different spreading sequence in every unit of length $T_d$ within the period $T_S$.

Alternatively, the block 342 could be configured to generate the same spreading sequence in every unit of length $T_d$ regardless of the period $T_S$, or to generate a different spreading sequence in every unit of length $T_d$ regardless of the period $T_S$.

The descrambled data are then provided to blocks 334(i), which adapt the descrambled data by a phase θ(m) provided from block 336. The adaptation is carried out by applying at least one of the plurality of linearly related phases to at least one sample of the digital data unit. Block 336 determines phase θ(m) in accordance with the feedback information provided by block 338 as described above.

The adapted descrambled data are then provided to blocks 340(i) representing despreaders, where the adapted descrambled data are despread with a spreading sequence provided from block 342. The despread symbols are provided to a combiner 344, which combines the symbols in accordance with a channel characteristic provided by the block 330. The combined data are then provided to block 346 representing a demodulator, and the demodulated data are provided for further processing (not shown).

Because the above-described interchangeability of the sequence of (de)scrambling, (de)spreading, and phase adapting operations, the above-described processing can be interpreted as adapting the adapted spreading sequence to arrive at the original spreading sequence. Thus on a conceptual level, the processing at the receiving station is also effective spreading sequence adaptation.

In contrast to the above-mentioned communication systems, there exist communication systems in which the state of the communication channel is similar (within acceptable error margin) for forward and reverse channel. In such a communication system, each of the communication station communicating with one another is likely to arrive with the same estimate of the channel state. Because the estimate of the channel state is likely the same at the communication stations communicating with one another, the communication stations may perform the above-described application of the linear phase shift to an effective spreading sequence without the need for a feedback.

An example of such a communication system is a Time Division Duplex (TDD) communication system, in which the stations are allocated the same frequency for transmission and reception.

Because no feedback is needed, referring back to FIG. 3, the conceptual model of receiving station and a transmitting station is similar to the transmitting station 302 and the receiving station 324, except the block 316 representing the feedback receiver is absent; and block 338 is connected directly to block 314.

A receiving communication station receives signal comprising user data from a transmitting communication station. The signal comprising data was arranged by the transmitting station in accordance with principles described in reference to FIG. 1 and FIG. 3 above. Thus both the transmitting station 302 and the receiving station 324 determine state of a communication channel in accordance with the above-described concepts. Both communication stations then determine a plurality of linearly related phases in accordance with the above-described concepts. Both communication stations then apply at least one of the plurality of linearly related phases to at least one sample of the effective spreading sequence. As disclosed above, each of the transmitting station 302 and the receiving station 324 applies the at least one of the plurality of linearly related phases with an opposite sign.

As discussed above, in communication systems, in which the state of the communication channel is similar (within acceptable error margin) for forward and reverse channel, the stations communicating with one another are likely to arrive with the same estimate of the channel characteristic. Such an estimate is highly dependent on channel state, e.g., a scatterer structure Therefore, with high probability only the communicating stations arrive with the same estimate of the channel state, and consequently, the choice of the same spreading code. As such, the used spreading code is changed depending on a "shared secret" (the channel characteristic), which is not known to third parties, i.e., other than the communicating stations.

This mechanism may be used to make interception of this communication difficult for the third parties, especially with selection of M as a large number because then even the below described improved blind determination becomes computationally infeasible.

It is, nevertheless, possible, that the receiving station does not know which adapted sequence s'(m) was used by the transmitting station. For example, in a TDD communication system the stations communicating with one another arrive with a different channel characteristic. Or, there was a feedback error in the FDD system. Under such a condition the receiving station may request re-transmission of information which adapted sequence s'(m) was used by the transmitting station or attempt a blind determination of the transmitted signal.

In general, a blind detection performs despreading and following sampling operation (see, FIG. 1 and associated text), for each of the possible M adapted sequences s'(m), and selecting that adapted sequence s'(m), which yielded the largest magnitude. This approach is computationally very expensive, especially for larger number M.

Mathematically, the despreading and sampling operation can be expressed by Equation (14), where $m_l$ denotes the delays corresponding to each of the blocks 328(i) of FIG. 3:

$$\sum_{m=0}^{SF-1} e^{\frac{-j2\pi im}{M}} \cdot s^*(m) \cdot r(m - m_l) \text{ for } i = 0, 1, \ldots, M - 1 \quad (14)$$

Considering Equation (14) it can be observed that rather than evaluating each equation separately, and taking the maximum value as prior art blind detection suggest, implementation of these evaluations can be simplified using the well-known Fast Fourier Transform (FFT) technique, see., e.g., "Discrete-Time Signal Processing," by Oppenheimer and Schafer, published by Prentice Hall.

The above-described concepts are valid for any communication system utilizing direct-sequence spread spectrum, and references to particular embodiments of a communication system, e.g., a wireless cellular communication system, have been made only for tutorial purposes.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the embodiments. Thus, the present invention is not intended to be limited to the embodiments shown herein but is to be accorded the widest scope consistent with the principles and novel features disclosed herein.

The invention claimed is:

1. An apparatus configured to adapt an effective spreading sequence in a communication system, comprising:
a channel estimation unit configured to determine a state of a communication channel, the channel estimation unit configured to:
  determine an operating environment of the communication system;
select a pre-determined model for the state of the communication channel in accordance with said determined operating environment;
  determine parameters of the pre-determined model in accordance with the state of the communication channel; and
  determine the state of the communication channel from the parameters and the pre-determined model; and
a determination unit configured to determine a plurality of linearly related phases in accordance with the state of the communication channel and apply at least one of the plurality of linearly related phases to at least one sample of the effective spreading sequence to generate an adapted spreading sequence, wherein the adapted spreading sequence is used to despread a received signal.

2. The method as claimed in claim 1 wherein the determination unit is further configured to:
transmit a feedback signal comprising said selected pre-determined model; and
transmit a feedback signal comprising said determined parameters.

3. An apparatus configured to adapt an effective spreading sequence in a communication system, comprising:
a channel estimation unit configured to determine a state of a communication channel; and
a determination unit configured to determine a plurality of linearly related phases in accordance with the state of the communication channel, the determination unit configured to:
determine a value of a phase shift factor $\alpha$ that maximizes the expression:

$$\text{Re}\left(\sum_m e^{\frac{j2\pi\alpha m}{M}} C_{ss}(m) C_{hh}^*(m)\right)$$

wherein:
  Re identifies real part;
  j is an imaginary unit;
  m is an index;
  M is number of phases;
  * identifies a complex conjugate;
  $C_{ss}(m)$ is a value of an aperiodic autocorrelation of the effective spreading sequence; and
  $C_{hh}(m)$ is a value of an aperiodic autocorrelation of an impulse response of the communication channel;
determine the plurality of linearly related phases in accordance with the phase shift factor $\alpha$; and
apply at least one of the plurality of linearly related phases to at least one sample of the effective spreading sequence to generate an adapted spreading sequence, wherein the adapted spreading sequence is used to despread a received signal.

4. An apparatus configured to adapt an effective spreading sequence in a communication system, comprising:
a channel estimation unit configured to determine a state of a communication channel; and
a determination unit configured to determine a plurality of linearly related phases in accordance with the state of the communication channel, the determination unit configured to:

calculate for each of a plurality of indexes m a corresponding value of an aperiodic autocorrelation of an impulse response of the communication channel $C_{hh}(m)$;

determine an index $m_{max}>0$ for which a magnitude of the value $C_{hh}(m)$ attains maximum;

determine a value of an aperiodic autocorrelation of an effective spreading sequence $C_{ss}(m_{max})$;

determine the plurality of linearly related phases in accordance with the $C_{hh}(m_{max})$ and the $C_{ss}(m_{max})$; and apply at least one of the plurality of linearly related phases to at least one sample of the effective spreading sequence to generate an adapted spreading sequence, wherein the adapted spreading sequence is used to despread a received signal.

5. The apparatus as claimed in claim 4, wherein the determination unit is further configured to:

determine a value of a phase shift factor $\alpha$ that maximizes the expression:

$$\mathrm{Re}\left(e^{\frac{j2\pi\alpha m_{max}}{M}} C_{ss}(m_{max}) \cdot C_{hh}^{*}(m_{max})\right)$$

wherein:
Re identifies real part;
j is an imaginary unit;
M is number of phases;
* identifies a complex conjugate; and
determine the plurality of linearly related phases in accordance with the phase shift factor $\alpha$.

6. The apparatus as claimed in claim 4, wherein the determination unit is further configured to:

determine a phase of $C_{hh}(m_{max})$;
determine a phase of $C_{ss}(m_{max})$; and
determine the plurality of linearly related phases in accordance with the phases of $C_{hh}(m_{max})$ and the $C_{ss}(m_{max})$.

7. The apparatus as claimed in claim 6, wherein the determination unit is further configured to:

determine a value of a phase shift factor $\alpha$ that minimizes the expression:

$$(\frac{2\pi\alpha m_{max}}{M} + \mathrm{arc}(C_{ss}(m_{max})) + \mathrm{arc}(C_{hh}^{*}(m_{max})))$$

wherein:
M is number of phases;
arc( ) is a phase of the argument;
* identifies a complex conjugate; and
determine the plurality of linearly related phases in accordance with the phase shift factor $\alpha$.

8. An apparatus configured to adapt an effective spreading sequence in a communication system, comprising:

a channel estimation unit configured to determine a state of a communication channel; and a determination unit configured to determine a plurality of linearly related phases in accordance with the state of the communication channel, the determination unit configured to:

determine indexes $m_1$ and $m_2$ for the largest and the second largest magnitudes of an impulse response of the communication channel h(m);

calculate an aperiodic autocorrelation of the impulse response of the communication channel $C_{hh}(max)$, wherein $m_{max}=m_1-m_2$;

calculate an aperiodic autocorrelation of an effective spreading sequence $C_{ss}(m_{max})$; and determine the plurality of linearly related phases in accordance with the $C_{hh}(m_{max})$ and the $C_{ss}(m_{max})$;

wherein the determination unit is further configured to apply at least one of the plurality of linearly related phases to at least one sample of the effective spreading sequence to generate an adapted spreading sequence, wherein the adapted spreading sequence is used to despread a received signal.

9. The apparatus as claimed in claim 8, wherein the determining unit is further configured to:

determine a value of a phase shift factor $\alpha$ that maximizes the expression:

$$\mathrm{Re}\left(e^{\frac{j2\pi\alpha m_{max}}{M}} C_{ss}(m_{max}) \cdot C_{hh}^{*}(m_{max})\right)$$

wherein:
Re identifies real part;
j is an imaginary unit;
M is number of phases;
* identifies a complex conjugate; and
determine the plurality of linearly related phases in accordance with the phase shift factor $\alpha$.

10. An apparatus configured to adapt an effective spreading sequence in a communication system, comprising:

a channel estimation unit configured to determine a state of a communication channel; and a determination unit configured to determine a plurality of linearly related phases in accordance with the state of the communication channel, the determination unit configured to:

determine indexes $m_1$ and $m_2$ for the largest and the second largest magnitudes of an impulse response of the communication channel h(m);

determine a phase of $C_{hh}(m_{max})$, wherein $m_{max}=m_1-m_2$;
determine a phase of $C_{ss}(m_{max})$;
determine the plurality of linearly related phases in accordance with the phases of $C_{hh}(m_{max})$ and the $C_{ss}(m_{max})$; and apply at least one of the plurality of linearly related phases to at least one sample of the effective spreading sequence to generate an adapted spreading sequence, wherein the adapted spreading sequence is used to despread a received signal.

11. The apparatus as claimed in claim 10, wherein the determination unit is further configured to:

determine a value of a phase shift factor $\alpha$ that minimizes the expression:

$$(\frac{2\pi\alpha m_{max}}{M} + \mathrm{arc}(C_{ss}(m_{max})) + \mathrm{arc}(C_{hh}^{*}(m_{max})))$$

wherein:
M is number of phases;
arc( ) is a phase of the argument;
* identifies a complex conjugate; and
determine the plurality of linearly related phases in accordance with the phase shift factor $\alpha$.

12. The apparatus as claimed in claim 10, wherein the determining unit is further configured to:

determine the phase difference between $h(m_1)$ and $h(m_2)$.

13. An apparatus for adapting an effective spreading sequence in a communication system, comprising:
a channel estimation unit configured to determine a state of a communication channel; and
a determination unit configured to determine a plurality of linearly related phases in accordance with the state of the communication channel and apply at least one of the plurality of linearly related phases to at least one sample of the effective spreading sequence to generate an adapted spreading sequence by evaluating for each index m an equation:

$$s'(m)=e^{j\theta(m)} \cdot s(m)$$

wherein:
s'(m) is the adapted spreading sequence;
s(m) is the effective spreading sequence;
j is an imaginary unit;

$$\theta(m) = \frac{2\pi\alpha m}{M}$$

is the m-th phase;
α is a phase factor; and
M is number of phases,
and wherein the determination unit is further configured to use the adapted spreading sequence to despread a received signal.

14. An apparatus configured to adapt an effective spreading sequence in a communication system, comprising:
a channel estimation unit configured to determine a state of a communication channel; and
a determination unit configured to determine a plurality of linearly related phases in accordance with the state of the communication channel and apply at least one of the plurality of linearly related phases to at least one sample of the effective spreading sequence to generate an adapted spreading sequence by evaluating for each index m an equation:

$$s'(m)=e^{-j\theta(m)} \cdot s(m)$$

wherein:
s'(m) is the adapted spreading sequence;
s(m) is the effective spreading sequence;
j is an imaginary unit;

$$\theta(m) = \frac{2\pi\alpha m}{M}$$

is the m-th phase;
α is a phase factor; and
M is the number of phases,
and wherein the adapted spreading sequence is used to despread a received signal.

15. Non-transitory computer readable media embodying a method for adapting an effective spreading sequence in a communication system, the method comprising:
determining a state of a communication channel which includes:
determining an operating environment of the communication system;
selecting a pre-determined model for the state of the communication channel in accordance with said determined operating environment;
determining parameters of the pre-determined model in accordance with the state of the communication channel; and
determining the state of the communication channel from the parameters and the pre-determined model;
determining a plurality of linearly related phases in accordance with the state of the communication channel; and
applying at least one of the plurality of linearly related phases to at least one sample of the effective spreading sequence.

16. The non-transitory computer readable media as claimed in claim 15 further comprising:
transmitting a feedback signal comprising said selected pre-determined model; and
transmitting a feedback signal comprising said determined parameters.

17. Non-transitory computer readable media embodying a method for adapting an effective spreading sequence in a communication system, the method comprising:
determining a state of a communication channel;
determining a plurality of linearly related phases in accordance with the state of the communication channel, including:
determining a value of a phase shift factor α that maximizes the expression:

$$Re\left(\sum_m e^{\frac{j2\pi\alpha m}{M}} C_{ss}(m) \cdot C_{hh}^*(m)\right)$$

wherein:
Re identifies real part;
j is an imaginary unit;
m is an index;
M is number of phases;
* identifies a complex conjugate;
$C_{ss}(m)$ is a value of an aperiodic autocorrelation of the effective spreading sequence; and
$C_{hh}(m)$ is a value of an aperiodic autocorrelation of an impulse response of the communication channel; and
determining the plurality of linearly related phases in accordance with the phase shift factor α; and
applying at least one of the plurality of linearly related phases to at least one sample of the effective spreading sequence.

18. Non-transitory computer readable media embodying a method for adapting an effective spreading sequence in a communication system, the method comprising:
determining a state of a communication channel;
determining a plurality of linearly related phases in accordance with the state of the communication channel, the means including:
calculating for each of a plurality of indexes m a corresponding value of an aperiodic autocorrelation of an impulse response of the communication channel $C_{hh}(m)$;
determining an index $m_{max}>0$ for which a magnitude of the value $C_{hh}(m)$ attains maximum;
determining a value of an aperiodic autocorrelation of an effective spreading sequence $C_{ss}(m_{max})$; and
determining the plurality of linearly related phases in accordance with the $C_{hh}(m_{max})$ and the $C_{ss}(m_{max})$; and applying at least one of the plurality of linearly related phases to at least one sample of the effective spreading sequence.

19. The non-transitory computer readable media as claimed in claim 18, wherein said determining the plurality of linearly related phases in accordance with the $C_{hh}(m_{max})$ and the $C_{ss}(m_{max})$ comprises:
  determining a value of a phase shift factor $\alpha$ that maximizes the expression:

$$Re\left(e^{\frac{j2\pi\alpha m_{max}}{M}} C_{ss}(m_{max}) \cdot C^*_{hh}(m_{max})\right)$$

wherein:
    Re identifies real part;
    j is an imaginary unit;
    M is number of phases;
    * identifies a complex conjugate; and
  determining the plurality of linearly related phases in accordance with the phase shift factor $\alpha$.

20. The non-transitory computer readable media as claimed in claim 18, wherein said determining the plurality of linearly related phases in accordance with the $C_{hh}(m_{max})$ and the $C_{ss}(m_{max})$ comprises:
  determining a phase of $C_{hh}(m_{max})$;
  determining a phase of $C_{ss}(m_{max})$; and
  determining the plurality of linearly related phases in accordance with the phases of $C_{hh}(m_{max})$ and the $C_{ss}(m_{max})$.

21. The non-transitory computer readable media as claimed in claim 20, wherein said determining the plurality of linearly related phases in accordance with the phases of $C_{hh}(m_{max})$ and the $C_{ss}(m_{max})$ comprises:
  determining a value of a phase shift factor $\alpha$ that minimizes the expression:

$$(\frac{2\pi\alpha m_{max}}{M} + arc(C_{ss}(m_{max})) + arc(C^*_{hh}(m_{max})))$$

wherein:
    M is number of phases;
    arc( ) is a phase of the argument;
    * identifies a complex conjugate; and
  determining the plurality of linearly related phases in accordance with the phase shift factor $\alpha$.

22. Non-transitory computer readable media embodying a method for adapting an effective spreading sequence in a communication system, the method comprising:
  determining a state of a communication channel;
  determining a plurality of linearly related phases in accordance with the state of the communication channel, including:
    determining indexes $m_1$ and $m_2$ for the largest and the second largest magnitudes of an impulse response of the communication channel h(m);
    calculating an aperiodic autocorrelation of the impulse response of the communication channel $C_{hh}(m_{max})$, wherein $m_{max}=m_1-m_2$;
    calculating an aperiodic autocorrelation of an effective spreading sequence $C_{ss}(m_{max})$; and
    determining the plurality of linearly related phases in accordance with the $C_{hh}(m_{max})$ and the $C_{ss}(m_{max})$; and
  applying at least one of the plurality of linearly related phases to at least one sample of the effective spreading sequence.

23. The non-transitory computer readable media as claimed in claim 22, wherein said determining the plurality of linearly related phases in accordance with the $C_{hh}(m_{max})$ and the $C_{ss}(m_{max})$ comprises:
  determining a value of a phase shift factor $\alpha$ that maximizes the expression:

$$Re\left(e^{\frac{j2\pi\alpha m_{max}}{M}} C_{ss}(m_{max}) \cdot C^*_{hh}(m_{max})\right)$$

wherein:
    Re identifies real part;
    j is an imaginary unit;
    M is number of phases;
    * identifies a complex conjugate; and
  determining the plurality of linearly related phases in accordance with the phase shift factor $\alpha$.

24. Non-transitory computer readable media embodying a method for adapting an effective spreading sequence in a communication system, the method comprising:
  determining a state of a communication channel;
  determining a plurality of linearly related phases in accordance with the state of the communication channel, including:
    determining indexes $m_1$ and $m_2$ for the largest and the second largest magnitudes of an impulse response of the communication channel h(m);
    determining a phase of $C_{hh}(m_{max})$, wherein $m_{max}=m_1-m_2$;
    determining a phase of $C_{ss}(m_{max})$; and
    determining the plurality of linearly related phases in accordance with the phases of $C_{hh}(m_{max})$ and the $C_{ss}(m_{max})$; and
  applying at least one of the plurality of linearly related phases to at least one sample of the effective spreading sequence.

25. The non-transitory computer readable media as claimed in claim 24, wherein said determining the plurality of linearly related phases in accordance with the phases of $C_{hh}(m_{max})$ and the $C_{ss}(m_{max})$ comprises:
  determining a value of a phase shift factor $\alpha$ that minimizes the expression:

$$(\frac{2\pi\alpha m_{max}}{M} + arc(C_{ss}(m_{max})) + arc(C^*_{hh}(m_{max})))$$

wherein:
    M is number of phases;
    arc( ) is a phase of the argument;
    * identifies a complex conjugate; and
  determining the plurality of linearly related phases in accordance with the phase shift factor $\alpha$.

26. The non-transitory computer readable media as claimed in claim 24, wherein said determining the phase of $C_{hh}(m_{max})$ comprises:
  determining the phase difference between $h(m_1)$ and $h(m_2)$.

27. Non-transitory computer readable media embodying a method for adapting an effective spreading sequence in a communication system, the method comprising:
  determining a state of a communication channel;
  determining a plurality of linearly related phases in accordance with the state of the communication channel;

applying at least one of the plurality of linearly related phases to at least one sample of the effective spreading sequence, the means including means for evaluating for each index m an equation:

$$s'(m)=e^{j\theta(m)}\cdot s(m)$$

wherein:
s'(m) is the adapted spreading sequence;
s(m) is the effective spreading sequence;
j is an imaginary unit;

$$\theta(m) = \frac{2\pi\alpha m}{M}$$

is the m-th phase;
α is a phase factor; and
M is number of phases.

28. Non-transitory computer readable media embodying a method for adapting an effective spreading sequence in a communication system, comprising:
determining a state of a communication channel;
determining a plurality of linearly related phases in accordance with the state of the communication channel;
applying at least one of the plurality of linearly related phases to at least one sample of the effective spreading sequence, the means including means for evaluating for each index m an equation:

$$s'(m)=e^{-j\theta(m)}\cdot s(m)$$

wherein:
s'(m) is the adapted spreading sequence;
s(m) is the effective spreading sequence;
j is an imaginary unit;

$$\theta(m) = \frac{2\pi\alpha m}{M}$$

is the m-th phase;
α is a phase factor; and
M is the number of phases.

29. An apparatus configured to adapt an effective spreading sequence in a communication system, comprising:
a feedback receiver configured to receive a feedback signal comprising a phase factor α and information enabling determination of a plurality of linearly related phases;
a device configured to determine the plurality of linearly related phases in accordance with the feedback by evaluating for each index m an equation:

$$\theta(m) = \frac{2\pi\alpha m}{M};$$

wherein:
M is number of phases; and
a multiplier configured to apply at least one of the plurality of linearly related phases to at least one sample of the effective spreading sequence to generate an adapted spreading sequence, wherein the adapted spreading sequence is used to spread a transmit signal.

30. The apparatus as claimed in claim 29, further comprising an evaluator configured to evaluate for each index m an equation:

$$s'(m)=e^{j\theta(m)}\cdot s(m)$$

wherein:
s'(m) is the adapted spreading sequence;
s(m) is the effective spreading sequence; and
j is an imaginary unit.

31. The apparatus as claimed in claim 29, further comprising an evaluator configured to evaluate for each index m an equation:

$$s'(m)=e^{-j\theta(m)}\cdot s(m)$$

wherein:
s'(m) is the adapted spreading sequence;
s(m) is the effective spreading sequence;
j is an imaginary unit.

32. An apparatus configured to adapt an effective spreading sequence in a communication system, comprising:
a feedback receiver configured to receive a feedback signal comprising information enabling determination of a plurality of linearly related phases wherein the feedback signal comprises a pre-determined model characterizing the communication channel and at least one parameter of the pre-determined model;
a device configured to determine the plurality of linearly related phases in accordance with the feedback; and
a multiplier configured to apply at least one of the plurality of linearly related phases to at least one sample of the effective spreading sequence to generate an adapted spreading sequence, wherein the adapted spreading sequence is used to spread a transmit signal.

33. The apparatus as claimed in claim 32, wherein said device configured to determine the plurality of linearly related phases is further configured to:
determine an aperiodic autocorrelation of an impulse response $C_{hh}(m)$ of the communication channel in accordance with the pre-determined model and the parameters;
determine a value of a phase shift factor α that maximizes the expression:

$$\text{Re}\left(\sum_m e^{\frac{j2\pi\alpha m}{M}} C_{ss}(m) C_{hh}^*(m)\right)$$

wherein:
Re identifies real part;
j is an imaginary unit;
m is an index;
M is number of phases;
* identifies a complex conjugate;
$C_{ss}(m)$ is a value of an aperiodic autocorrelation of the effective spreading sequence; and
determine the plurality of linearly related phases in accordance with the phase shift factor α.

34. The apparatus as claimed in claim 32, wherein said device is further configured to:
calculate for each of a plurality of indexes m a corresponding value of an aperiodic autocorrelation of an impulse response $C_{hh}(m)$ of the communication channel in accordance with the pre-determined model and the parameters;
determine an index $m_{max}>0$ for which a magnitude of the value $C_{hh}(m)$ attains maximum;
determine a value of an aperiodic autocorrelation of an effective spreading sequence $C_{ss}(m_{max})$; and
determine the plurality of linearly related phases in accordance with the $C_{hh}(m_{max})$ and the $C_{ss}(m_{max})$.

35. The apparatus as claimed in claim 34, wherein the device is further configured to:
determine a value of a phase shift factor α that maximizes the expression:

$$\text{Re}\left(e^{\frac{j2\pi\alpha m_{max}}{M}} C_{ss}(m_{max}) \cdot C_{hh}^*(m_{max})\right)$$

wherein:
Re identifies real part;
j is an imaginary unit;
M is number of phases;
* identifies a complex conjugate; and
determine the plurality of linearly related phases in accordance with the phase shift factor α.

36. The apparatus as claimed in claim 34, wherein the device is further configured to:
determine a phase of $C_{hh}(m_{max})$;
determine a phase of $C_{ss}(m_{max})$; and
determine the plurality of linearly related phases in accordance with the phases of $C_{hh}(m_{max})$ and the $C_{ss}(m_{max})$.

37. The apparatus as claimed in claim 36, wherein said device is further configured to:
determine a value of a phase shift factor α that minimizes the expression:

$$\left(\frac{2\pi\alpha m_{max}}{M} + \text{arc}(C_{ss}(m_{max})) + \text{arc}(C_{hh}^*(m_{max}))\right)$$

wherein:
M is number of phases;
arc( ) is a phase of the argument;
* identifies a complex conjugate; and
determine the plurality of linearly related phases in accordance with the phase shift factor α.

38. The apparatus as claimed in claim 32, wherein said device is further configured to:
determine an impulse response of the communication channel h(m) in accordance with the pre-determined model and the parameters;
determine indexes $m_1$ and $m_2$ for the largest and the second largest magnitudes of the impulse response of the communication channel h(m);
calculate an aperiodic autocorrelation of the impulse response of the communication channel $C_{hh}(m_{max})$, wherein $m_{max}=m_1-m_2$;
calculate an aperiodic autocorrelation of an effective spreading sequence $C_{ss}(m_{max})$; and
determine the plurality of linearly related phases in accordance with the $C_{hh}(m_{max})$ and the $C_{ss}(m_{max})$.

39. The apparatus as claimed in claim 38, wherein said device is further configured to:
determine a value of a phase shift factor α that maximizes the expression:

$$\text{Re}\left(e^{\frac{j2\pi\alpha m_{max}}{M}} C_{ss}(m_{max}) \cdot C_{hh}^*(m_{max})\right)$$

wherein:
Re identifies real part;
j is an imaginary unit;
M is number of phases;
* identifies a complex conjugate; and
determine the plurality of linearly related phases in accordance with the phase shift factor α.

40. An apparatus configured to adapt an effective spreading sequence in a communication system, comprising:
a feedback receiver configured to receive a feedback signal comprising information enabling determination of a plurality of linearly related phases;
a device configured to determine the plurality of linearly related phases in accordance with the feedback, the device configured to:
determine an impulse response of the communication channel h(m) in accordance with the pre-determined model and the parameters;
determine indexes $m_1$ and $m_2$ for the largest and the second largest magnitudes of the impulse response of the communication channel h(m);
determine a phase of $C_{hh}(m_{max})$, wherein $m_{max}=m_1-m_2$;
determine a phase of $C_{ss}(m_{max})$; and
determine the plurality of linearly related phases in accordance with the phases of $C_{hh}(m_{max})$ and the $C_{ss}(m_{max})$; and
a multiplier configured to apply at least one of the plurality of linearly related phases to at least one sample of the effective spreading sequence to generate an adapted spreading sequence, wherein the adapted spreading sequence is used to spread a transmit signal.

41. The apparatus as claimed in claim 40, wherein said device is further configured to:
determine a value of a phase shift factor α that minimizes the expression:

$$\left(\frac{2\pi\alpha m_{max}}{M} + \text{arc}(C_{ss}(m_{max})) + \text{arc}(C_{hh}^*(m_{max}))\right)$$

wherein:
M is number of phases;
arc( ) is a phase of the argument;
* identifies a complex conjugate; and
determine the plurality of linearly related phases in accordance with the phase shift factor α.

42. The apparatus as claimed in claim 40, wherein said device is further configured to:
determine the phase difference between $h(m_1)$ and $h(m_2)$.

43. An apparatus configured to adapt an effective spreading sequence in a communication system, comprising:
a feedback receiver configured to receive a feedback signal comprising information enabling determination of a plurality of linearly related phases;
a device configured to determine the plurality of linearly related phases in accordance with the feedback; and
a multiplier configured to apply at least one of the plurality of linearly related phases to at least one sample of the effective spreading sequence to generate an adapted spreading sequence, wherein the adapted spreading sequence is used to spread a transmit signal by evaluating for each index m an equation:

$$s'(m)=e^{j\theta(m)} \cdot s(m)$$

wherein:
s'(m) is the adapted spreading sequence;
s(m) is the effective spreading sequence;
j is an imaginary unit;

$$\theta(m) = \frac{2\pi\alpha m}{M}$$

is the m-th phase;
α is a phase factor; and
M is number of phases.

44. An apparatus configured to adapt an effective spreading sequence in a communication system, comprising:
a feedback receiver configured to receive a feedback signal comprising information enabling determination of a plurality of linearly related phases;
an apparatus configured to determine the plurality of linearly related phases in accordance with the feedback; and
a multiplier configured to apply at least one of the plurality of linearly related phases to at least one sample of the effective spreading sequence to generate an adapted spreading sequence, wherein the adapted spreading sequence is used to spread a transmit signal by
evaluating for each index m an equation:

$$s'(m) = e^{j\theta(m)} \cdot s(m)$$

wherein:
s'(m) is the adapted spreading sequence;
s(m) is the effective spreading sequence;
j is an imaginary unit;

$$\theta(m) = \frac{2\pi\alpha m}{M}$$

is the m-th phase;
α is a phase factor; and
M is the number of phases.

45. Non-transitory computer readable media embodying a method for adapting an effective spreading sequence in a communication system, the method comprising:
receiving a feedback signal comprising information enabling determination of a plurality of linearly related phases, wherein the feedback signal comprises a phase factor α;
determining the plurality of linearly related phases in accordance with the feedback, including
evaluating for each index m an equation:

$$\theta(m) = \frac{2\pi\alpha m}{M};$$

wherein:
M is number of phases; and
applying at least one of the plurality of linearly related phases to at least one sample of the effective spreading sequence.

46. The non-transitory computer readable media as claimed in claim 45, wherein said applying at least one of the plurality of linearly related phases to at least one sample of the effective spreading sequence comprises:
evaluating for each index m an equation:

$$s'(m) = e^{j\theta(m)} \cdot s(m)$$

wherein:
s'(m) is the adapted spreading sequence;
s(m) is the effective spreading sequence; and
j is an imaginary unit.

47. The non-transitory computer readable media as claimed in claim 45, wherein said applying at least one of the plurality of linearly related phases to at least one sample of the effective spreading sequence comprises:
evaluating for each index m an equation:

$$s'(m) = e^{-j\theta(m)} \cdot s(m)$$

wherein:
s'(m) is the adapted spreading sequence;
s(m) is the effective spreading sequence;
j is an imaginary unit.

48. Non-transitory computer readable media embodying a method for adapting an effective spreading sequence in a communication system, the method comprising:
receiving a feedback signal comprising information enabling determination of a plurality of linearly related phases wherein the feedback signal comprises a pre-determined model characterizing the communication channel; and at least one parameter of the pre-determined model;
determining the plurality of linearly related phases in accordance with the feedback; and
applying at least one of the plurality of linearly related phases to at least one sample of the effective spreading sequence.

49. The non-transitory computer readable media as claimed in claim 48, wherein said determining the plurality of linearly related phases comprises:
determining an aperiodic autocorrelation of an impulse response $C_{hh}(m)$ of the communication channel in accordance with the pre-determined model and the parameters;
determining a value of a phase shift factor α that maximizes the expression:

$$\text{Re}\left(\sum_m e^{\frac{j2\pi\alpha m}{M}} C_{ss}(m) C_{hh}^*(m)\right)$$

wherein:
Re identifies real part;
j is an imaginary unit;
m is an index;
M is number of phases;
* identifies a complex conjugate;
$C_{ss}(m)$ is a value of an aperiodic autocorrelation of the effective spreading sequence; and
determining the plurality of linearly related phases in accordance with the phase shift factor α.

50. The non-transitory computer readable media as claimed in claim 48, wherein said determining the plurality of linearly related phases comprise:
calculating for each of a plurality of indexes m a corresponding value of an aperiodic autocorrelation of an impulse response $C_{hh}(m)$ of the communication channel in accordance with the pre-determined model and the parameters;
determining an index $m_{max} > 0$ for which a magnitude of the value $C_{hh}(m)$ attains maximum;
determining a value of an aperiodic autocorrelation of an effective spreading sequence $C_{ss}(m_{max})$; and
determining the plurality of linearly related phases in accordance with the $C_{hh}(m_{max})$ and the $C_{ss}(m_{max})$.

51. The non-transitory computer readable media as claimed in claim 50, wherein said determining the plurality of linearly related phases in accordance with the $C_{hh}(m_{max})$ and the $C_{ss}(m_{max})$ comprises:
  determining a value of a phase shift factor $\alpha$ that maximizes the expression:

$$\mathrm{Re}\left(e^{\frac{j2\pi\alpha m_{max}}{M}} C_{ss}(m_{max}) \cdot C_{hh}^*(m_{max})\right)$$

wherein:
   Re identifies real part;
   j is an imaginary unit;
   M is number of phases;
   * identifies a complex conjugate; and
  determining the plurality of linearly related phases in accordance with the phase shift factor $\alpha$.

52. The non-transitory computer readable media as claimed in claim 50, wherein said determining the plurality of linearly related phases in accordance with the $C_{hh}(m_{max})$ and the $C_{ss}(m_{max})$ comprises:
  determining a phase of $C_{hh}(m_{max})$;
  determining a phase of $C_{ss}(m_{max})$; and
  determining the plurality of linearly related phases in accordance with the phases of $C_{hh}(m_{max})$ and the $C_{ss}(m_{max})$.

53. The non-transitory computer readable media as claimed in claim 52, wherein said determining the plurality of linearly related phases in accordance with the phases of $C_{hh}(m_{max})$ and the $C_{ss}(m_{max})$ comprises:
  determining a value of a phase shift factor $\alpha$ that minimizes the expression:

$$\left(\frac{2\pi\alpha m_{max}}{M} + \mathrm{arc}(C_{ss}(m_{max})) + \mathrm{arc}(C_{hh}^*(m_{max}))\right)$$

wherein:
   M is number of phases;
   arc( ) is a phase of the argument;
   * identifies a complex conjugate; and
  determining the plurality of linearly related phases in accordance with the phase shift factor $\alpha$.

54. The non-transitory computer readable media as claimed in claim 48, wherein said determining the plurality of linearly related phases comprises:
  determining an impulse response of the communication channel h(m) in accordance with the pre-determined model and the parameters;
  determining indexes $m_1$ and $m_2$ for the largest and the second largest magnitudes of the impulse response of the communication channel h(m);
  calculating an aperiodic autocorrelation of the impulse response of the communication channel $C_{hh}(m_{max})$, wherein $m_{max}=m_1-m_2$;
  calculating an aperiodic autocorrelation of an effective spreading sequence $C_{ss}(m_{max})$; and
  determining the plurality of linearly related phases in accordance with the $C_{hh}(m_{max})$ and the $C_{ss}(m_{max})$.

55. The non-transitory computer readable media as claimed in claim 54, wherein said determining the plurality of linearly related phases in accordance with the $C_{hh}(m_{max})$ and the $C_{ss}(m_{max})$ comprises:
  determining a value of a phase shift factor $\alpha$ that maximizes the expression:

$$\mathrm{Re}\left(e^{\frac{j2\pi\alpha m_{max}}{M}} C_{ss}(m_{max}) \cdot C_{hh}^*(m_{max})\right)$$

wherein:
   Re identifies real part;
   j is an imaginary unit;
   M is number of phases;
   * identifies a complex conjugate; and
  determining the plurality of linearly related phases in accordance with the phase shift factor $\alpha$.

56. Non-transitory computer readable media embodying a method for adapting an effective spreading sequence in a communication system, the method comprising:
  receiving a feedback signal comprising information enabling determination of a plurality of linearly related phases;
  determining the plurality of linearly related phases in accordance with the feedback, including
  determining an impulse response of the communication channel h(m) in accordance with the pre-determined model and the parameters;
  determining indexes $m_1$ and $m_2$ for the largest and the second largest magnitudes of the impulse response of the communication channel h(m);
  determining a phase of $C_{hh}(m_{max})$, wherein $m_{max}=m_1-m_2$;
  determining a phase of $C_{ss}(m_{max})$; and
  determining the plurality of linearly related phases in accordance with the phases of $C_{hh}(m_{max})$ and the $C_{ss}(m_{max})$; and
  applying at least one of the plurality of linearly related phases to at least one sample of the effective spreading sequence.

57. The non-transitory computer readable media as claimed in claim 56, wherein said determining the plurality of linearly related phases in accordance with the phases of $C_{hh}(m_{max})$ and the $C_{ss}(m_{max})$ comprise:
  determining a value of a phase shift factor $\alpha$ that minimizes the expression:

$$\left(\frac{2\pi\alpha m_{max}}{M} + \mathrm{arc}(C_{ss}(m_{max})) + \mathrm{arc}(C_{hh}^*(m_{max}))\right)$$

wherein:
   M is number of phases;
   arc( ) is a phase of the argument;
   * identifies a complex conjugate; and
  determining the plurality of linearly related phases in accordance with the phase shift factor $\alpha$.

58. The non-transitory computer readable media as claimed in claim 56, wherein said determining the phase of $C_{hh}(m_{max})$ comprises:
  determining the phase difference between $h(m_1)$ and $h(m_2)$.

59. Non-transitory computer readable media embodying a method for adapting an effective spreading sequence in a communication system, the method comprising:
  receiving a feedback signal comprising information enabling determination of a plurality of linearly related phases;
  determining the plurality of linearly related phases in accordance with the feedback; and
  applying at least one of the plurality of linearly related phases to at least one sample of the effective spreading sequence, including evaluating for each index m an equation:

$$s'(m)=e^{j\theta(m)}\cdot s(m)$$

wherein:
s'(m) is the adapted spreading sequence;
s(m) is the effective spreading sequence;
j is an imaginary unit;

$$\theta(m) = \frac{2\pi\alpha m}{M}$$

is the m-th phase;
α is a phase factor; and
M is number of phases.

60. Non-transitory computer readable media embodying a method for adapting an effective spreading sequence in a communication system, the method comprising:
receiving a feedback signal comprising information enabling determination of a plurality of linearly related phases;
determining the plurality of linearly related phases in accordance with the feedback; and
applying at least one of the plurality of linearly related phases to at least one sample of the effective spreading sequence including evaluating for each index m an equation:

$$s'(m)=e^{-j\theta(m)}\cdot s(m)$$

wherein:
s'(m) is the adapted spreading sequence;
s(m) is the effective spreading sequence;
j is an imaginary unit;

$$\theta(m) = \frac{2\pi\alpha m}{M}$$

is the m-th phase;
α is a phase factor; and
M is the number of phases.

* * * * *